United States Patent [19]
Chapman

[11] Patent Number: 6,056,809
[45] Date of Patent: May 2, 2000

[54] HIGH EFFICIENCY PERMANENT AIR FILTER AND METHOD OF MANUFACTURE

[75] Inventor: Rick L. Chapman, 427 Lupine Way, Ventura, Calif. 93003

[73] Assignee: Rick L. Chapman, Ventura, Calif.

[21] Appl. No.: 09/155,059

[22] PCT Filed: Oct. 15, 1997

[86] PCT No.: PCT/US97/18482

§ 371 Date: Sep. 18, 1998

§ 102(e) Date: Sep. 18, 1998

[87] PCT Pub. No.: WO98/17368

PCT Pub. Date: Apr. 30, 1998

Related U.S. Application Data

[60] Provisional application No. 60/028,786, Oct. 18, 1996.

[51] Int. Cl.[7] .................................................. B01D 27/06
[52] U.S. Cl. .................................. 96/67; 55/486; 55/521; 55/DIG. 5; 95/57; 96/69; 264/258; 264/DIG. 48
[58] Field of Search .................................... 96/55, 15, 17, 96/57–59, 66–69, 98–100; 95/63, 69, 70, 78, 57; 55/497, 521, 527, 528, 486–488, DIG. 39, DIG. 5, DIG. 35, DIG. 33; 264/257, 258, DIG. 8, DIG. 48

[56] References Cited

U.S. PATENT DOCUMENTS

| | | | |
|---|---|---|---|
| 4,375,718 | 3/1983 | Wadsworth et al. | 55/DIG. 5 |
| 4,886,526 | 12/1989 | Joannou | 96/67 |
| 4,978,372 | 12/1990 | Pick | 96/67 |
| 5,240,479 | 8/1993 | Bachinski | 55/528 X |
| 5,403,383 | 4/1995 | Jaisinghani | 96/99 X |
| 5,419,953 | 5/1995 | Chapman | 95/57 X |
| 5,496,507 | 3/1996 | Angadjivand et al. | 55/528 X |
| 5,540,761 | 7/1996 | Yamamoto | 96/67 |
| 5,645,057 | 7/1997 | Watt et al. | 264/DIG. 48 |
| 5,651,811 | 7/1997 | Frey et al. | 96/69 |
| 5,667,562 | 9/1997 | Midkiff | 96/15 |
| 5,690,719 | 11/1997 | Hodge | 55/DIG. 35 |
| 5,792,242 | 8/1998 | Haskett | 55/DIG. 39 |
| 5,922,096 | 7/1999 | Stemmer | 55/521 X |
| 5,989,303 | 11/1999 | Hodge | 55/486 |

Primary Examiner—Richard L. Chiesa
Attorney, Agent, or Firm—Marvin E. Jacobs

[57] ABSTRACT

An air filter for use in residential and commercial heating and air conditioning systems including a laminated unit (100) having a filter media (102) where either side of the filter media (102) has a porous layer (104, 106) of passive electrostatic netting. The air filter has a corrugation configuration (142, 144) to increase the available surface area when compared to conventional flat filters.

21 Claims, 6 Drawing Sheets

HIGH EFFICIENCY PERMANENT AIR FILTER AND METHOD OF MANUFACTURE

CROSS-REFERENCE TO RELATED APPLICATION

This application is a national stage application of International Application No. PCT/US97/18482, filed on Oct. 15, 1997, which claims the benefit of U.S. Provisional Application Ser. No. 60/028,786, filed on Oct. 18, 1996.

TECHNICAL BACKGROUND

The present invention relates to filters cleanable by washing or vacuuming or the like for inlet air heating and air conditioning systems used in residential or commercial buildings and, more particularly, this invention relates to an electrostatic filter for such systems having an extended service life.

BACKGROUND ART

Inlet air filters for heating and air conditioning systems have been in use for decades. The inlet air or primary filter was originally intended to protect the heating coils and mechanical devices such as fans from damage by airborne particles. As the harmful effect of inhaled particles on human health became known, inlet air filters were designed remove this particulate matter from the air.

The most popular prior art configuration is a thin, rectangular, disposable filter. The filter contains fiberglass, animal hair, fibrous foam or polymeric media or aluminum mesh encased in a cardboard or plastic frame. Prior art filters can comprised polyester panels, urethane foam or latex coated animal hair. Recently, prior art filters containing static or passive electrostatic media have become available.

Most residential resistance specifications require air filters to have an initial pressure drop of no more than 0.22 inches of water for an air flow rate of 300 feet per minute. The dust spot efficiency for typical prior art air filters tested using ASHRAE 52.1-1992 is 20% or less. The ASHRAE efficiencies of four types of commercially available filters follows:

TABLE 1

| Filter Type | Area of Media Square Feet | ASHRAE EFFICIENCY |
|---|---|---|
| Fiberglass Throwaway | 4.0 | <20% |
| Electrostatic (Passive) | 4.0 | 20% |
| Electrostatic (Fibers) | Up to 8.9 | 30% |
| Pleated Polyester Blend | Up to 6.9 | 25% |

When these filters are first placed in use across an air stream, they have a very low filtering efficiency. Typically, the exhaust or dust spot efficiency is about 8%. However, as dust particles are collected, the dust collection efficiency can increase to approximately 20%. At this point, the filter is ready to be replaced. Prior art filters are usually difficult to clean since the dust particles become embedded in the media.

Another current concern is the recognition that particles below 10 microns are not filtered by the cilia hairs in the nose and are therefore inhaled into a human lung. Fibrous particles such as asbestos and fiberglass are known to cause respiratory diseases. Most current inlet air filters for heating and air conditioning systems are not very efficient in capturing these small particles. Filters containing layers of electrostatic media perform better within this range of particles but these filters also become clogged. Since they cannot be efficiently cleaned they must be replaced.

DISCLOSURE OF THE INVENTION

It has been discovered in accordance with the invention that the angle of approach of the air stream effects the particle capture efficiency, the life of the filter between cleaning and the difficulty of cleaning the filter. The filter of the invention causes a non-perpendicular path of air flow resulting from the corrugated or pleated configuration of the novel air filter. Because of the corrugated configuration, more surface area exists than with a standard, flat, prior art air filter. The increased surface area of the novel filter also results in a lower pressure drop than experienced with prior art electrostatic air filters. The filter has significantly longer life between cleanings and it is very easy to clean. The novel air filter's efficiency for removing particulate matter is also an improvement over the prior art.

The purpose of the invention is to provide an upstream passive electrostatic layer disposed upon a filter media layer wherein both layers are in a corrugated or pleated configuration to increase filter surface area when compared to a flat surfaced air filter.

A number of embodiment configurations can be utilized which incorporate my novel concept. The following are examples.

Two Layer Embodiment. A filter media will be comprised of fibers of a plastic material such as polyester or nylon held together with binder, preferably an acrylic thermo setting binder. The filter media is selected from material which can capture in excess of 80% of particulate matter of 10 micron or less in size. The filter media layer is preferably made from polyester having 6–15 Denier fibers, an acrylic resin binder preferably containing an antimicrobial agent. The media may contain a curable resin such as a thermosetting, light cured or water activated resin. The resin may be dispersed throughout the media as applied as stripes to the media at locations corresponding to the tops of the pleats, before or after pleating, preferably after pleating. The resin is then cured to a rigid state to hold the pleats in shape. Such a thermal-set filter media, in combination with a passive electrostatic layer can be corrugated without the need of metallic grills to maintain the corrugated shape. The desired passive electrostatic layer can be described as a netting material. The electrostatic layer may be made from media such as polypropylene, polyester, nylon or polycarbonate. More preferably, the electrostatic layer is made from DEL-NET RB0404-12P, a product of Applied Extrusion Technology, Middletown, Del. or Equiliuent. In use, the air filter would be installed with the electrostatic layer facing upstream. In this embodiment, stitching, stapling, thermal welding, adhesives or other means could be utilized to attach the filter media and electrostatic layer to one another. Additionally, a second electrostatic layer may be disposed on the downstream side of the filter media to increase the filter's efficiency.

Five Layer Embodiment. In this configuration, either side of the filter can be placed upstream.

This embodiment has a central filter media layer from the same material as described above although it is not required to have a thermal-setting property.

Disposed on either side of the central layer is a passive electrostatic layer of the same material described earlier. Disposed on the outward facing surface of each electrostatic layer is a grill, suitably formed of expanded metal. The grill is preferably made from metal. Most preferable, the grill is made from a non-corrosive material such as aluminum. A non-metallic material may also be utilized as a grill. The purpose of the grill is to provide a deformable material which will cause the filter, once corrugated, to maintain its corrugated shape. The grill layers is required when a resilient filter media is used which will tend to return to a flat shape.

When it was attempted to form the electrostatic layers and central layer into a corrugated configuration having angled surfaces, the material comprising these layers have a resilient property which would attempt return to a flat configuration as soon as the forming tool was released from the surface. A further aspect of this invention is a method of forming flat media into an angled surface in a manner to prevent it from returning to its original configuration.

In one alternative of the five layer embodiment, the electrostatic media is placed between sheets of expanded metal screen or grill. The edge of at least one screen is wrapped over the opposing edge to lock the assembly together and restrain the media from expanding and returning to its original shape.

In a second alternative of the five layer embodiment, the electrostatic media layers, the central layer and the outside grills are stitched to each other.

In a third alternative of the five layer embodiment, a respective grill and electrostatic layer are adhesively bonded to one another. During the assembly process, a central layer is disposed between two layers of laminated grill and electrostatic media.

The grill may be easily washed. Either side of the grill may face downstream provided the grill layer is the outside layer. It has been discovered that if the grill is positioned between the electrostatic and central layers, adhesive may be used to bond the grill to both layers. This has the advantage of overcoming the resilient tendency of the central layer to become flat. The grill however, may only be disposed between both layers on the upstream side. Testing has shown that while the air flow tends to force the electrostatic layer into the grill and central layer on the upstream side, on the downstream side air flow tends to displace the electrostatic layer away from the central layer. Therefore, it is preferred to position the grill layer as the outside layer on the downstream side.

My novel air filter may be made into any size. However, as the size of the filter increases, it is preferred that the gauge of the grill layers increase. Because of the resilient tendency of the central layer material as described earlier, the larger the air filter, heavier gauge material is required to maintain the filter's corrugated shape especially in the central surface area of the filter.

Another feature of the invention is the use of two sheets of expanded metal. The prior art used expanded metal grills only for cleanable, washable metal filters. In the invention the expanded metal layers are bent into an angled form at the same time as the electrostatic media and central layer. The metal layers prevent the angled electrostatic media and central layer from returning to a flat form. The metal layers have very wide openings and thin strands which do not contribute to capturing particles but also do not contribute to pressure drop of the composite media.

The filter of the invention is optimally angled to capture particles. It can be cleaned by shaking and/or by washing. The media has low pressure drop and high efficiency for the range of particles experienced with the inlet air. Because it can be cleaned and reused, my invention can be considered a permanent filter.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
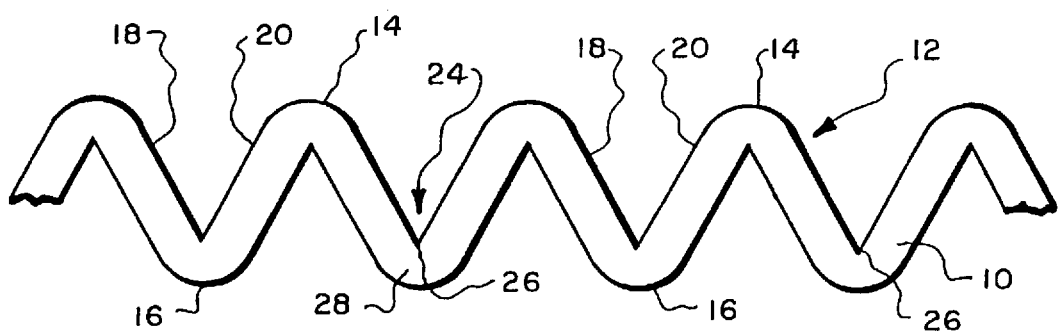
FIG. 1 is cross sectional view of a multilayer filter media folded or pleated to increase surface area to 160% of the flat media.

The passive electrostatic filter contains a core layer of a bendable material, from 0.05 to 0.45 inches in thickness selected from polymeric foam or a high loft fibrous polymeric material such as air laid polyester fibers having a density of from 0.5 to 5 ounces per square yard (OPSY). The fibers are resin bonded by a resin such as an acrylic resin or point bonded or needle bonded. In a preferred embodiment the central or core layer is comprised of a thermal set material. This material removes most of the particles from the air stream, typically at least 80% of the incoming particles having sizes up to 10 microns.

The particle capture efficiency of the core material is enhanced by placing a layer of electrostatic polymer material on each side of the core material. The material can be woven or non woven. More preferably, passive electrostatic materials are used which become charged as air flows past the polymers that tend to have natural static charges. These are preferred since the available active electrostatic fibrous materials produce an undesirably high pressure drop as a filtration media and are not cleanable. The passive material is usually formed by casting, extrusion or weaving from a polymer of a nonsaturated alkene monomer having 2–8 carbon atoms. One type of material is woven polypropylene netting having a thickness from 0.01 to 0.10 inches, usually from 0.02 to 0.06 inches. The yarn diameter can be from 1–35 denier, preferably from 5–20 denier. The ratio of warp to fill yarn is from 1.2/1 to 3/1 and the netting is woven in a manner to resemble a honeycomb structure. A commercially available material is a honeycomb weave netting of 8 mil thick polypropylene fibers available in thicknesses of 0.03 and 0.05 inches. The yarn count is 51 warp and 32 fill.

The outside grill layer does not contribute to filtering but is present to hold the angled media after it has been formed. Again, the layer must be capable of being easily bent or deformed during the assembly process. If the sheet of material is too thick it is difficult to bend and if it is too thin, it is not capable of holding the 3 layer media in its bent shape. Expanded metal such as steel or aluminum having a thickness from 0.010 to 0.25 inches, performs satisfactorily in the filter of the invention. The most preferable gage thickness is dependent upon the size of the air filter. Larger air filters will require a more sturdy or heavier gage grill. The expanded metal grill should have open area of at least 70%. Open area can be provided by thin strands from 0.01 to 0.18 in thickness expanded to rectangular or parallelogram openings having an area of at least 0.5 square inches.

In the design of the filter of the invention, the following five methods of capturing particles were considered in providing a filter having the optimum combination of high efficiency with the lowest possible resistance:

1. Straining or screening
2. Interception
3. Impaction or impingement
4. Diffusion effects
5. Electrostatic attraction

EXAMPLE 1

The exterior layers on either side of the air filter media are comprised of expanded aluminum having a thickness of 0.040 inches and strand thickness of about 0.04 inches. The rectangular openings were 1.5×0.75 inches.

The passive electrostatic layers adjacent each exterior layer is comprised of polypropylene netting having a thickness of 0.03 inches, warp and fill yarn diameters of 8 mil, a weight of 3 oz/yard and a yarn count of 51 warp yarns per inch and 32 fill yarns per inch.

The center layer disposed between the electrostatic layers is a stiff, high loft polyester having the following properties:

| | |
|---|---|
| Weight (ounces per square yard): | 4.5 +/− 10% |
| Gauge (inches): | 0.25 +/− 5% |
| Fiber Content: | Polyester (6 & 15 Denier) |
| Binder Type: | Acrylic Latex (solids 38%) |
| Porosity (cfm/Ftsq.@0.5WG): | 740 cfm |
| Color: | White |
| Texture: | Stiff/Lofty |
| Antimicrobial: | Aegis or Equiliuent |

The effect of the angle of the media to particle capture efficiency was tested by placing a flat panel of the 5-layer filter media of Example 1 across an air steam flowing at 300 feet per minute (FPM). Particles at different sizes were counted with a Hiac/Rayco laser particle counter both before and after the filter to establish efficiencies at different micron sizes. The angle of the filter corrugation was changed in 10 degree increments from 0 degrees (flat) to 90 degrees.

TABLE 2

AVERAGE EFFICIENCY

| ANGLE | 0.3 Micron | 0.5 Micron | 1.0 Micron | 3.0 Micron | 5.0 Micron | 10.0 Micron |
|---|---|---|---|---|---|---|
| FLAT | 1.025 | 4.025 | 22.0 | 48.0 | 62.45 | 67.72 |
| 10° | 1.4 | 5.6 | 34.0 | 53.0 | 65.7 | 69.2 |
| 20° | 1.6 | 5.5 | 34.0 | 66.0 | 80.2 | 83.0 |
| 30° | 1.6 | 5.8 | 27.0 | 64.0 | 74.8 | 77.6 |
| 40° | 1.7 | 6.7 | 27.0 | 65.0 | 73.8 | 80.9 |
| 50° | 1.6 | 8.6 | 28.0 | 64.0 | 74.3 | 81.7 |
| 60° | 1.775 | 6.15 | 29.25 | 68.75 | 76.48 | 84.58 |
| 70° | 1.875 | 5.55 | 28.5 | 66.0 | 75.15 | 85.85 |
| 80° | 2.9 | 5.9 | 22.0 | 51.0 | 64.6 | 80.9 |
| 90° | 1.0 | 5.25 | 21.0 | 49.0 | 60.9 | 71.8 |

The experiment indicates that the optimum efficiencies are with the filter at an angle to the incoming air from 20–75 degrees, preferably from 40 to 60 degrees.

The angled surface supplies an increase in efficiency. The resistance to air flow can be lowered by increasing the surface area of the filter suitably by alternate bending of the panel to form opposed angled surfaces. Most filters operate at low efficiency by straining alone until enough dust particles are captured. As the filter fills with larger particles, its efficiency in capturing small particles that can deposit in the respiratory system increases. The ability of a filter to initially capture small particles is improved by adding electrostatic media to the filter, especially when the filter is positioned at an angle greater than 10 degrees or less than 80 degrees to the incoming air.

Referring now to FIG. 1, increased area and angled surface are both provided by corrugating the media 10 to form folds 12 having alternating upper and lower outer curved ends 14, 16 and opposed angled walls 18, 20. The ratio of the length of the sum of the two angled surfaces is at least 1.2 to 2.5 times the length of the distance between adjacent curved ends and preferably from 1.4 to 2.0. The joinder 24 of the inner walls can form a radius.

Figure 2:
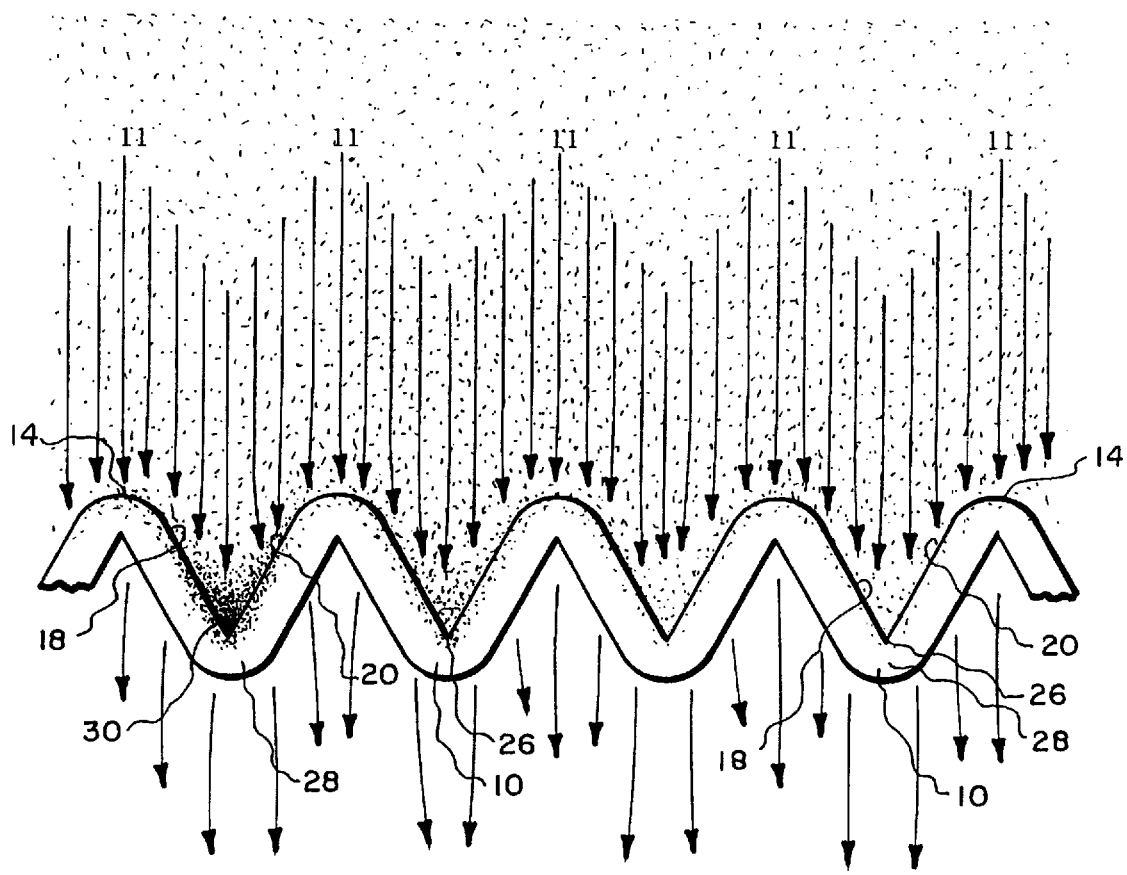
FIG. 2 is another cross section of the filter of FIG. 1, shown in service.
Figure 3:
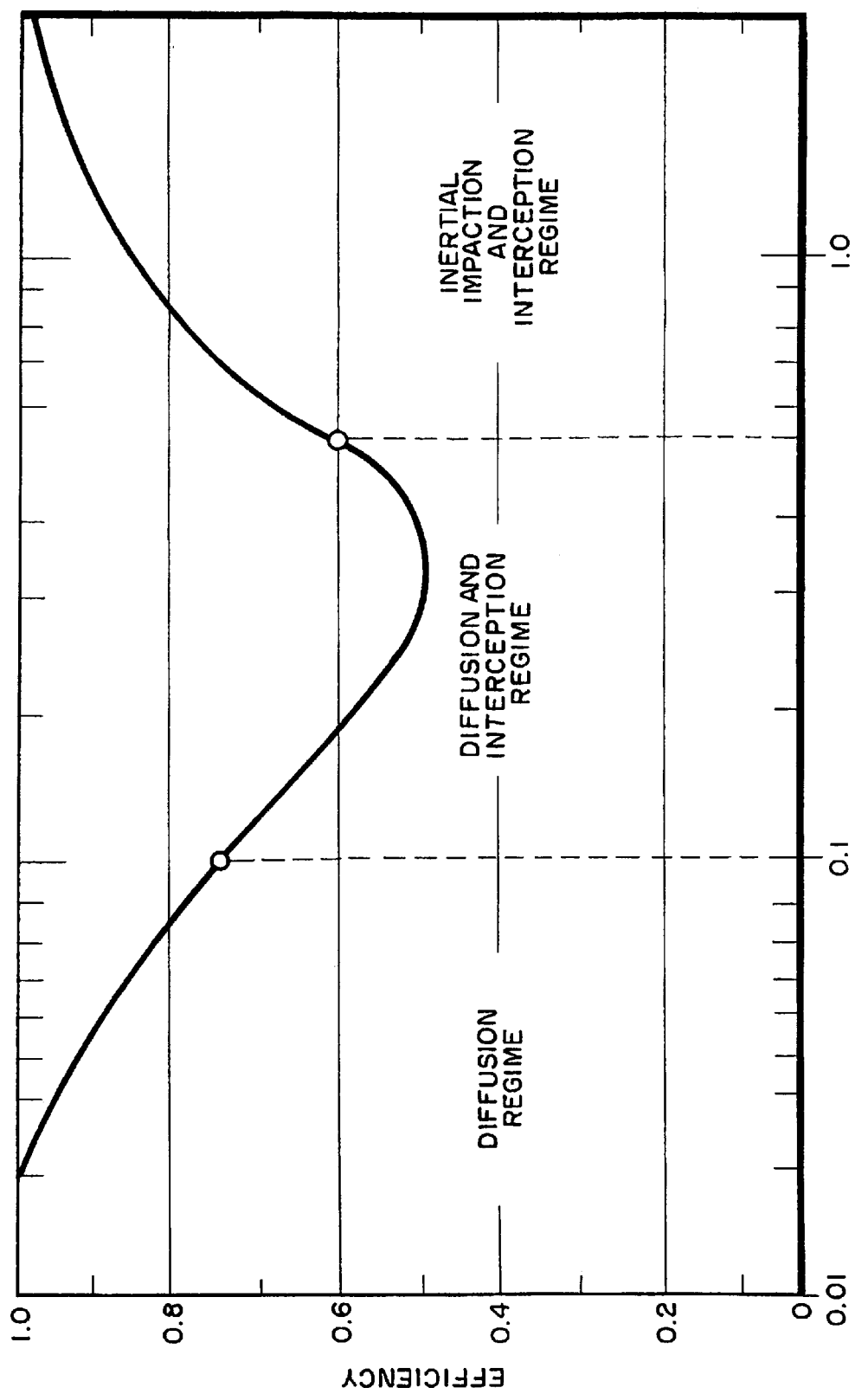
FIG. 3 is a schematic graph showing filter efficiency.

Referring now to FIG. 2, as the incoming air 11 contacts the folded media 10, the air will diffuse across the slanted wall surfaces 18, 20. The air will search for the path of least resistance to pass through the filter 10. In the beginning, the path of least resistance will be the slanted wall surfaces 18,20 rather than at the inner ends 26. As shown in FIG. 2, the particles 30, especially those having larger diameters, will begin to collect at the bottom of the fold.

The air flowing to the bottom of the fold will be deflected changing its direction. The air, carrying smaller particulate matter gradually flows up the angled walls 18, 20 of the fold. The walls will become loaded with small dust and sub micron sized particles. The larger particles which travel at a higher velocity and inertia will collect at the bottom increasing the efficiency for collecting sub micron sized particles. The same mechanism will occur on the side walls as the bottoms of the folds load with dust.

All of the mechanisms of filtration are enhanced. Straining and electrostatic deposition become more effective due to increased dwell time. The deflection of the air increases the turbulence of the air flow enhancing impaction and interception of both large and small particles. Diffusional mechanisms are always in effect capturing sub-micron particles.

The distance between adjacent outer ends 14 and 16 controls the thickness of the filter. The final filter assembly including the outside border frame has a thickness from 0.5 to 4 inches, usually about 0.75 inch thick.

Experiments

Five filters about 2 feet wide and one inch thick prepared in accordance with Example 1. Each were tested for dust collecting efficiency in the 0.3 micron to 10.0 micron range from an air steam flowing at 300 feet per minute. The air temperature was 70.2° F. and the relative humidity was 55%. Testing was by the laser counting system previously described.

The test results are as follows:

| | | |
|---|---|---|
| 1. | Complete filter number 1 | |
| | 0.3 micron | 6.8% |
| | 0.5 | 12.3% |
| | 5.0 | 86.4% |
| | 10.0 | 91.63% |
| 2. | Complete filter number 2 | |
| | 0.3 micron | 7.2% |
| | 0.5 | 14.3% |
| | 5.0 | 83.92% |
| | 10.0 | 94.28% |
| 3. | Complete filter number 3 | |
| | 0.3 micron | 6.7% |
| | 0.5 | 15.7% |
| | 5.0 | 85.6% |
| | 10.0 | 90.89% |
| 4. | Complete filter number 4 | |
| | 0.3 micron | 6.8% |
| | 0.5 | 14.6% |
| | 5.0 | 88.6% |
| | 10.0 | 93.51% |
| 5. | Complete filter number 5 | |
| | 0.3 micron | 7.3% |
| | 0.5 | 13.4% |
| | 5.0 | 84.9% |
| | 10.0 | 92.66% |

The resistance was 0.15 W.G. and the average of the 5 tests are tabled below as well as the average efficiency of a typical flat commercial electrostatic filter wherein the resistance was 0.20 W.G. or 33% greater.

| PARTICLE SIZE (Micron) | NOVEL AIR FILTER EFFICIENCY (%) | PRIOR ART AIR FILTER EFFICIENCY (%) |
|---|---|---|
| 0.3 | 6.8 | 2.8 |
| 0.5 | 14.1 | 4.4 |
| 5.0 | 85.9 | 83.7 |
| 10.0 | 93.6 | 91.3 |

Figure 4:
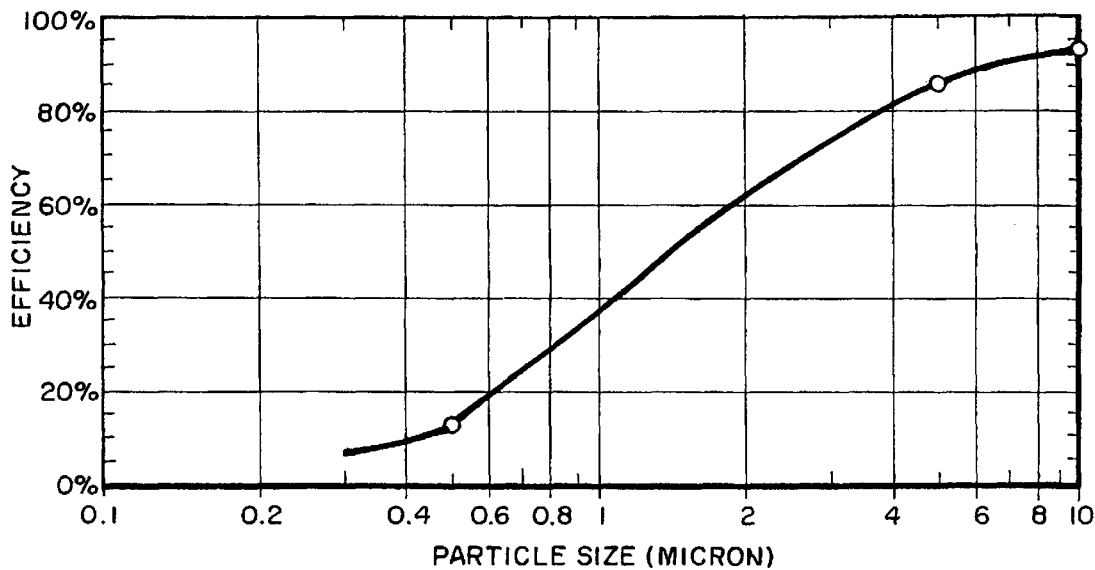
FIG. 4 is a graph showing the efficiency of folded electrostatic filters of the invention in the 0.3 to 10 micron range.
Figure 5:
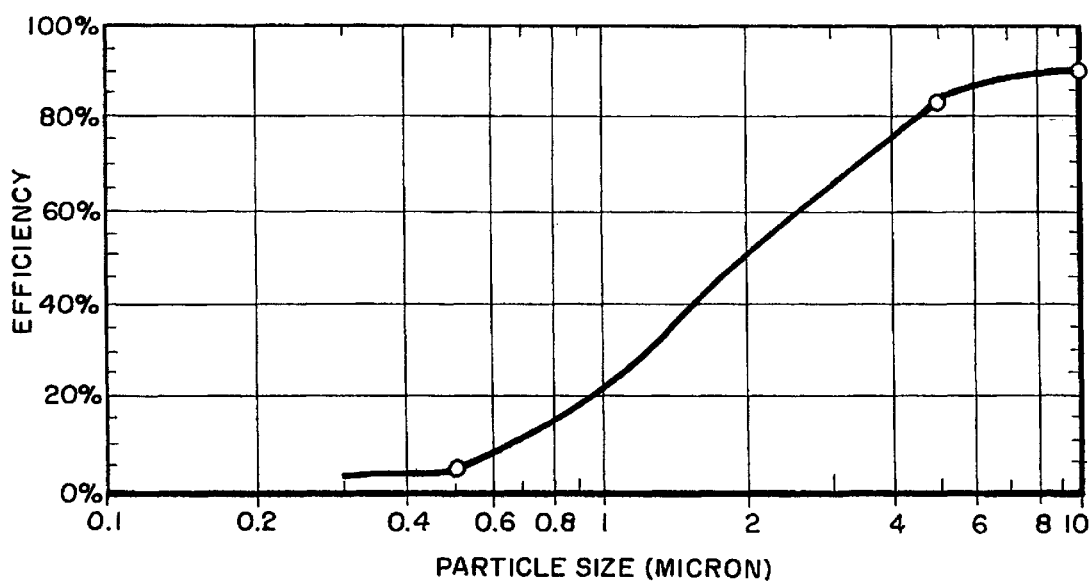
FIG. 5 is a graph showing the efficiency of flat commercial electrostatic filters in the same range tested under the same conditions.

FIG. 4 is a graphical representation of the above results for my novel air filter design. FIG. 5 depicts the results for a flat prior art air filter.

In comparing my novel air filter design to the prior art, at the 0.30 micron range the average amount of particles observed by the laser upstream of the filter is 750,000 particles per minute. A prior art filter efficiency of 2.8% would permit more than 729,000 particles per minute to pass through. The radial pleat having an efficiency of 6.80% would permit 30,000 fewer particles per minute.

The particle size that has the largest filtration efficiency difference is at one micron. For this size, an upstream laser observed approximately 12,000 particles per minute. With the prior art filter having a 22% efficiency, more than 9,360 particles per minute would pass through the filter. However, my novel filter design has an approximate efficiency of 37% for filtering one micron sized particles and would permit less than 7,560 particles per minute to pass through my filter design.

The radial pleat or corrugated air filter has an increased surface area over the prior air flat filter. Its ease of cleaning can be attributed to the filters ability to let the dust collect between the folds and not enter the filter media itself. The filter will have a larger dust holding capacity and will last longer between cleaning. As the filter collects dust, the filter efficiency will increase.

Figure 6:
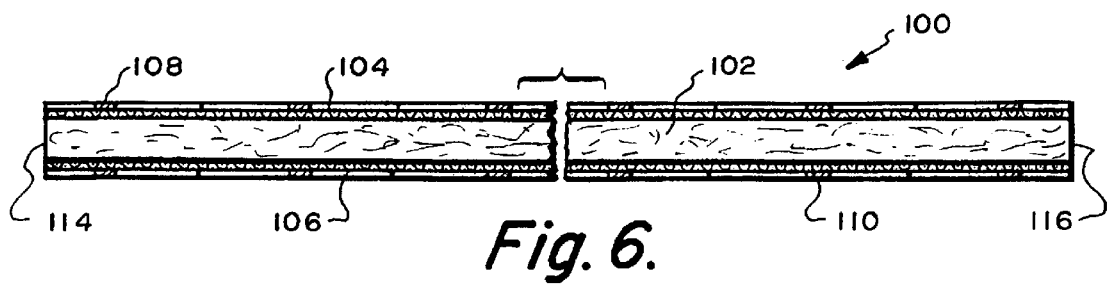
FIG. 6 is a schematic view of one embodiment of the novel 5 layer media air filter.
Figure 7:
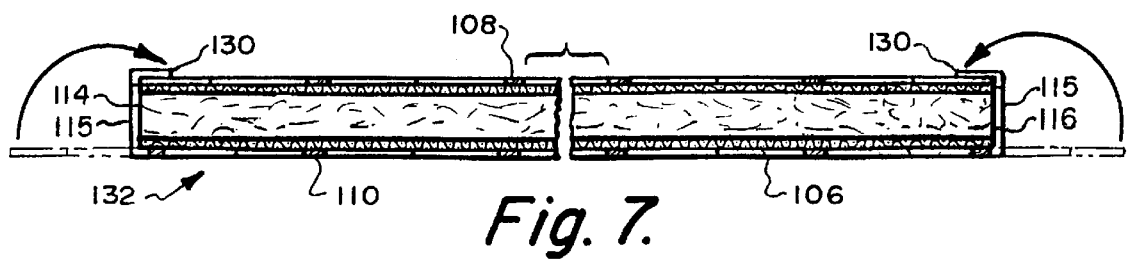
FIG. 7 is a schematic view of one embodiment of the novel 5 layer media air filter after securing the ends.

Another aspect of the invention is in the fabrication of the filters. As previously discussed, one embodiment is a five layer assembly 100 as shown in FIG. 6. The central layer 102 is a thin, bendable foam or high loft polyester layer. The central layer 102 is covered with layers 104, 106 of the passive electrostatic netting. The outer open mesh expanded metal layer grills 108, and 110 complete the stack. One grill layer, either 108 or 110 is slightly longer at 114 and 116 by ⅛ to ½ inch on each side.

The longer length of one grill layer folds over the ends of the corrugations and extends over and forms a mechanical bond 130 with the upper expanded metal layer 108. The locked flat assembly 132 prevents the folds from returning to flat condition. After corrugation, the filter is completed by securing a U-shaped metal channel, not shown, such as aluminum, to the four edges of the folded assembly. An adhesive, preferably water-based, can be applied to the U-shaped channel to further secure the filter in place thereby preventing the corrugated folds from returning to a flat condition and dislodging from the frame.

Figure 8:
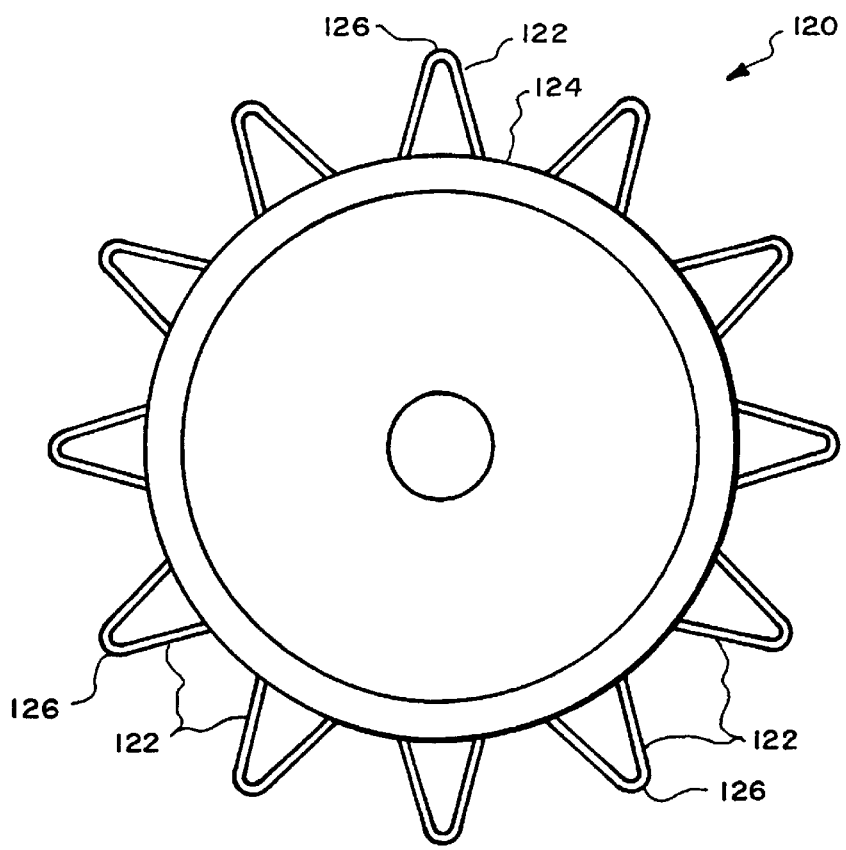
FIG. 8 is an end view in elevation of the roller for corrugating the media in one embodiment of the invention.

Referring again to FIG. 8, the rollers 120 contains a plurality of offset V-shaped forming members 122 evenly spaced on the surface 124 of the roller 120 a distance apart sufficient to form a curved radius in the media at the bottom of a fold. The sharp, pointed tops 126 of the forming members 122 form the inner pointed ends of the 5-layer folded assembly.

The filter assembly of the invention is suitable for replacement of filters used for filtering incoming air supplied to residential heating and air conditioning systems. The filters usually have a thickness from 0.5 inch to 3 inches, typically 1 to 2 inches and are rectangular usually having a width of 1 to 3 feet and a length of 1 to 3 feet.

Figure 9:
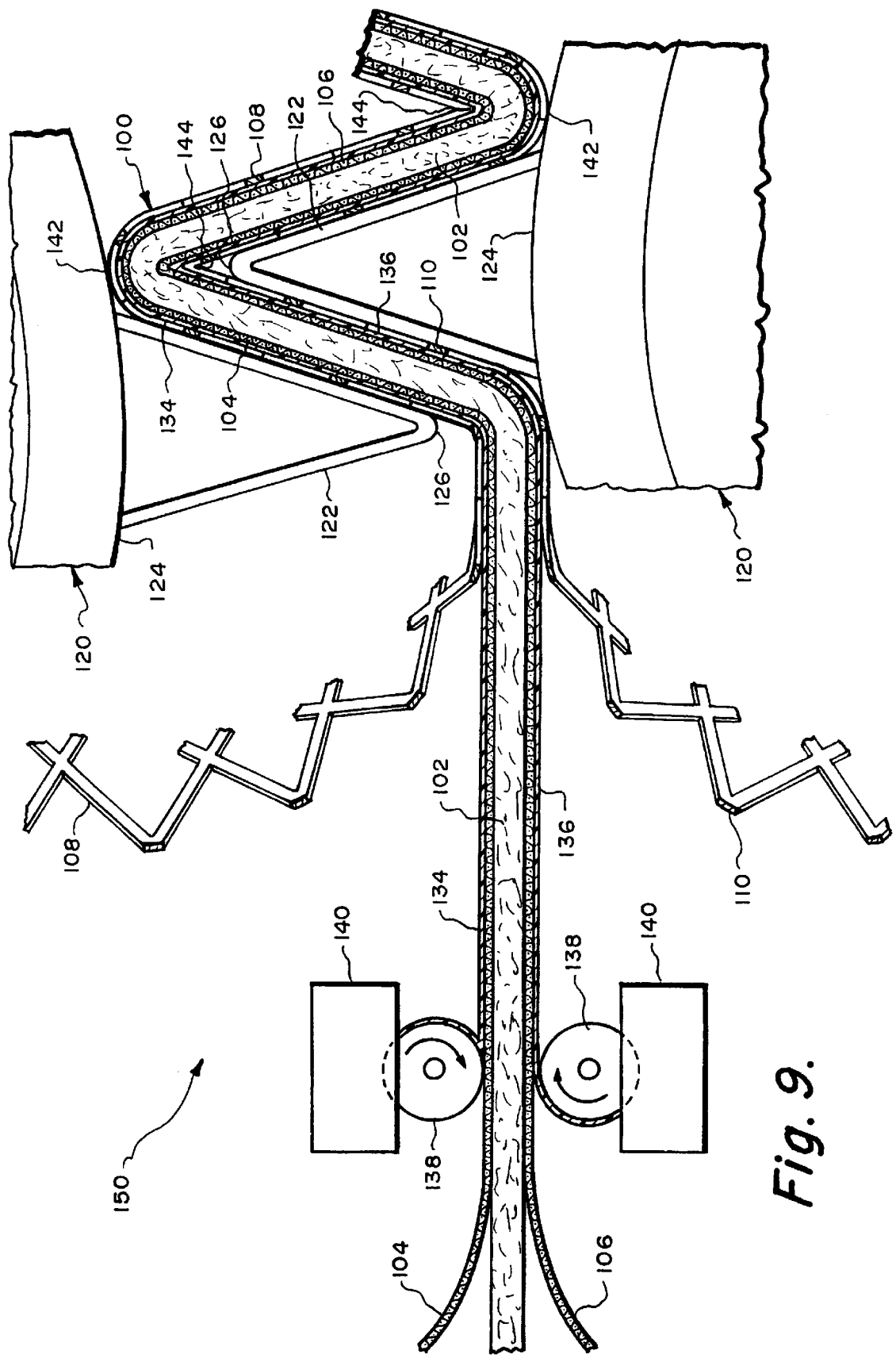
FIG. 9 is a schematic view of an embodiment of a continuous system for forming the filter media of the invention.
Figure 10:
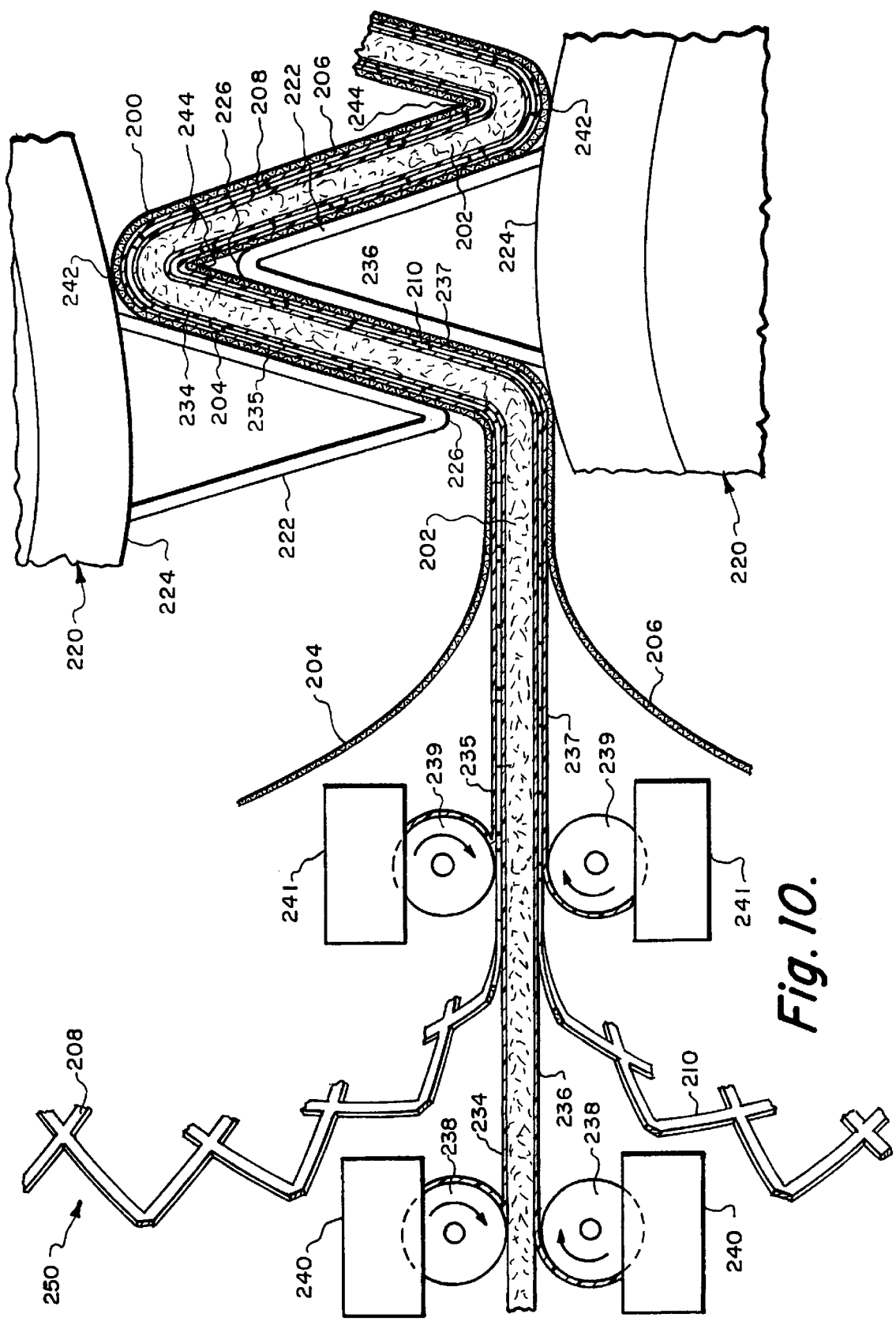
FIG. 10 is a schematic view of another embodiment of a continuous system for forming filter media of the invention.

A 5-layer filter assembly according to FIG. 9 and Example 1 and a flat construction competitor's filter were tested by an independent test laboratory at a test velocity of 300 feet per minute. Results follow:

TABLE

| Particle Size | EFFICIENCY | |
|---|---|---|
| (MICRON) | COMPETITION | INVENTION |
| 0.3/0.5 | 0.8% | 5.6% |
| 0.7/1.0 | 0.4% | 21.2% |
| 1.0/2.0 | 12.7% | 42.4% |
| 2.0/3.0 | 40.7% | 73.1% |
| 3.0/5.0 | 55.7% | 83.9% |
| 5.0/1.0 | 56.2% | 88.1% |

The filter of the invention shows substantially better capture efficiency at all particle sizes. The filter of the invention will capture substantially all particles that affect respiratory or allergic reactions.

It is to be realized that only preferred embodiments of the invention have been described and that numerous substitutions, modifications and alterations are permissible without departing from the spirit and scope of the invention as defined in the following claims.

What is claimed is:

1. A washable air filter for filtering inlet air to a heating and/or air conditioning system comprising an assembly formed of:

a deformable, non-electrostatic pad of a high-loft, air laid, resin bonded polymeric fibers having a high filtering efficiency for 10 micron and less particles and having a thickness from 0.05 to 0.45 inches and a density from 0.5 to 5 ounces per yard, said pad having a front surface and a rear surface;

a layer of woven, porous, passive electrostatic fabric disposed on either side of the pad having an inside surface in contact with said surfaces, and having an outside surface;

a deformable metal grill disposed in contact with the outside surfaces of the fabric; and said assembly having a pleated configuration in which the angle between adjacent wall surfaces of the pleats is from 20° to 75°.

2. An air filter according to claim 1 in which the passive electrostatic fabric is a woven fabric selected from the group consisting of a polyalkylene of 1–8 carbon atoms.

3. An air filter according to claim 2 in which the passive electrostatic fabric is a woven net.

4. An air filter according to claim 2 in which the passive electrostatic woven fabric comprises polypropylene.

5. An air filter according to claim 4 in which the woven fabric has a thickness of from 0.01 inch to 0.1 inch.

6. An air filter according to claim 2 in which the polymeric fibers are polyester.

7. An air filter according to claim 6 in which the bonding resin is an acrylic resin.

8. An air filter according to claim 7 in which the filter has a periphery and further including a stiff frame engaging said periphery.

9. An air filter according to claim 8 in which said filter is stitched about said periphery.

10. A filter according to claim 3 in which the thickness of the net material is from 0.02 to 0.06 inches.

11. A filter according to claim 10 in which the woven net has a weave which appears to have a honeycomb structure.

12. A filter according to claim 1 in which the filter has an efficiency for 0.3 micron particles of at least 6.8%.

13. A method of filtering inlet air to an air conditioning and heating system with a permanent filter comprising the steps of:

placing a washable filter as defined in claim 1 in the path of the inlet air;

capturing particles from the inlet air onto the filter pad;

removing the filter from the path of the inlet air;

washing the filter pad to remove the particles; and repositioning the filter in the path of the inlet air stream.

14. A method of manufacturing a washable filter for filtering inlet air flow to a heating and/or air conditioning system, comprising the steps of:

placing a sheet of passive electrostatic netting woven from polyalkylene fibers in contact with the surfaces of a non-electrostatic pad of a high-loft, air laid, resin bonded, polymeric fibers having a thickness from 0.05 to 0.45 inch and a density from 0.5 to 5 ounces per yard and a high efficiency for 10 micron or less particles;

placing a layer of porous metal in contact with the outer surfaces of the netting to form an assembly; and pleating said assembly to form pleats in which the angle between wall surfaces is from 20° to 75°.

15. A method according to claim 14 in which the passive electrostatic netting is a woven fabric selected from the group consisting of a polyalkylene of 1–8 carbon atoms.

16. A method according to claim 15 in which the passive electrostatic woven fabric consists of polypropylene.

17. A method according to claim 16 in which the woven fabric has a thickness of from 0.01 inch to 0.1 inch.

18. A method according to claim 17 in which the polymeric fibers are polyester.

19. A method according to claim 18 in which the bonding resin is an acrylic resin.

20. A method according to claim 14 in which said filter has a periphery and further including the step of encasing said periphery in a metal frame.

21. A method according to claim 20 further including the step of stitching said filter about said periphery.

* * * * *